Feb. 11, 1969    J. T. FERRARIS    3,427,487

MOTOR BRUSH HOLDER

Filed Aug. 29, 1966

INVENTOR.
JOHN T. FERRARIS
BY Thomas L. Betts
William S. Henry
HIS ATTORNEYS

3,427,487
MOTOR BRUSH HOLDER
John T. Ferraris, Stamford, Conn., assignor, by mesne assignments, to Consolidated Foods Corporation, Chicago, Ill., a corporation of Maryland
Filed Aug. 29, 1966, Ser. No. 575,864
U.S. Cl. 310—247          5 Claims
Int. Cl. H01r *39/40;* F16f *1/06*

This invention relates to brush holders for commutator motors and in particular to a spring for holding a carbon brush against the commutator with a constant force and with substantially no vibration frequency or harmonics.

Helical wire, compression springs and leaf springs have long been known for this purpose. More recently, coil springs of the type disclosed in U.S. Patent 2,695,968 have been proposed for this purpose. However, brush bounce and chatter has not been eliminated and as a result arcing continues to be a source of excessive heat and brush and commutator wear.

In accordance with my invention, a brush spring is provided by pre-stressing a spring metal sheet, having a thickness on the order of 0.001 to 0.005 inch, in the plane of the spring metal sheet and normal to its longitudinal axis. As a result, a spring in the form of a tube is provided. The spring is inserted into a brush holder from the end of the holder adjacent the commutator. The brush holder has a wedge-shaped separator in the path of the tubular spring which opens and flattens the tube so that it again resumes its strip shape and may be coiled up on the back side of the separator. The brush is also inserted from the same end of the brush holder and bears on the tubular end of the spring some distance from the wedge-shaped separator. As the brush wears the tubular portion of spring elongates by the reaction between the spring and separator. Since the closing force of the spring against the wedge separator is constant, the force acting on the brush is also constant. Further, the vibration frequencies of the tube in the axial direction will be substantially the same over the length of the tubular portion of the spring due to the inherent rigid characteristics of a tube.

An object of the invention therefore is to provide a motor brush spring and holder arrangement in which the brush is urging against a commutator at a constant force for the full extent of brush wear and in which the harmonic of the spring is imperceptible for the full extent of brush wear.

Another object of the invention is to provide a motor brush spring in the form of a tube which bears on the brush at one axial end.

Another object of the invention is to provide a simple, inexpensively manufactured brush spring which is reliable in operation for extended periods of time and over a relatively wide range of distances.

The foregoing objects and further objects and advantages of the invention will become apparent from the following description of a presently preferred embodiment illustrated in the accompanying drawing in which.

Figure 1:
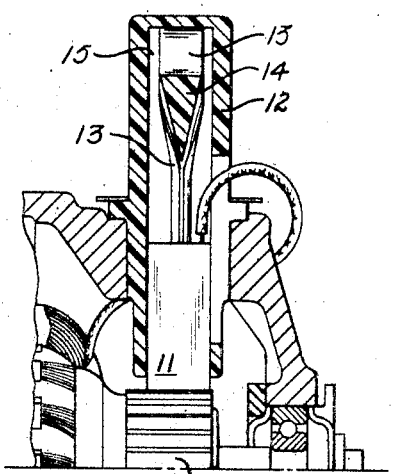
FIG. 1 is a somewhat partial sectional plan view of a motor having a brush arrangement according to the invention.
Figure 2:
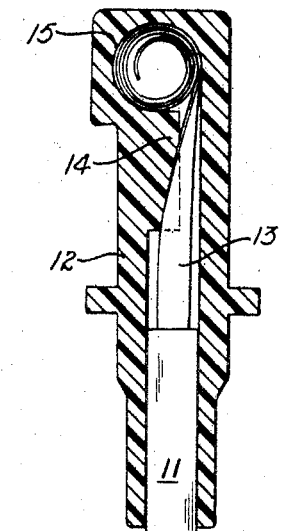
FIG. 2 is an enlarged sectional elevation of the brush holder arrangement according to FIG. 1.
Figure 4:
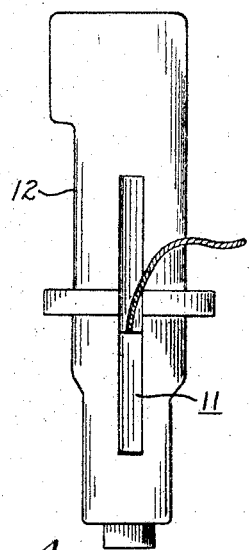
FIG. 4 is a plan view of the brush assembly of FIGS. 1 and 2.
Figure 3:
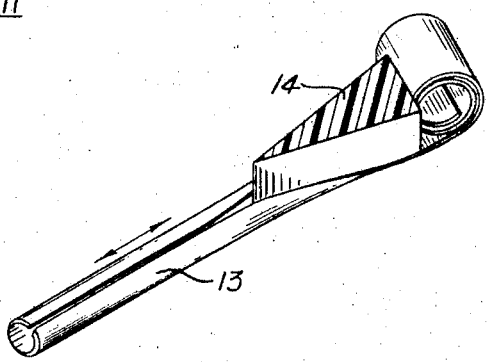
FIG. 3 is a partial perspective view of the spring and cooperating portion of the brush housing as shown in FIGS. 1 and 2.

Referring more particularly to FIGS. 1 and 2, reference numeral 10 designates the commutator of an electric motor of well known construction and design. A carbon brush 11 is slidable within a brush holder 12 and engages the peripheral surface of the commutator 10 as is well known. The end of the brush 11 remote from the commutator engages a spring 13 which has been pre-stressed so that it tends to form a tube as best seen in FIG. 3. The tube is split, of course, and by forcing the tubular portion of the spring toward the wedge-shaped separator 14 the tubular portion of the spring is flattened and can be coiled behind the separator 14 FIG. 3.

When the brush 11 is inserted into the brush holder 12 from the commutator end thereof, the tubular portion of the spring 13 is opened and flattened by the separator 14 so that the spring is compactly coiled in space 15 of the brush holder 12. As the brush wears in use, the tubular portion of the spring 13 elongates to the same extent as the brush wears and the force imparted to the brush 11 by the spring 13 is proportional to the pre-stress causing the spring to close at the diverging sides of the separator as it tends to form into its tubular shape.

These forces therefore are substantially constant. It will be noted also that the spring rate or harmonic of the spring 13 is substantially zero due to the rigid characteristics of the tube and as a result, the brush is not as able to bounce as when springs of the prior art are used.

It will be apparent to those skilled in the art that the spring according to my invention may be used with many forms and differently designed brush holder apparatus. Therefore, the foregoing description is intended to show only a presently preferred embodiment of the invention.

What is claimed is:
1. A brush holder comprising a brush housing member, a carbon brush slidable within said member and adapted to project from said housing member, transverse spring means within said brush housing engaging said carbon brush for urging said brush into a position projecting from said brush housing; said transverse spring means having at least a tubular portion axially engageable with one end of said carbon brush, and separating means within said brush housing engaging said tubular portion for opening and flattening said tubular portion when said tubular portion is moved in one direction relative to said separating means.

2. A brush holder according to claim 1 wherein said separating means comprises a wedge-shaped separator, said tubular portion having a longitudinal seam and the apex of said separator being received in said seam.

3. A brush holder according to claim 2 wherein said separator is integral with said brush housing.

4. A brush holder according to claim 3 wherein a portion of said brush housing defines a space adjacent the base of said separator, said transverse spring means having said flattened portion between a major surface of said separator and the opposite inner surface of said housing, and said flattened spring means being coiled within said space.

5. A brush holder according to claim 4 wherein the portion of said brush housing defining said space is enlarged relative to the remainder of said brush housing for receiving said flattened coiled portion of said transverse spring means.

References Cited

UNITED STATES PATENTS 2,862,124  11/1958  Huber _____ 310—246

MILTON O. HIRSHFIELD, *Primary Examiner.*

L. A. ROUSE, *Assistant Examiner.*

U.S. Cl. X.R.

267—1